No. 729,874. Patented June 2, 1903.

UNITED STATES PATENT OFFICE.

AUGUST LEOPOLD LASKA, OF OFFENBACH-ON-THE-MAIN, GERMANY, ASSIGNOR TO THE FIRM OF K. OEHLER, ANILIN- & ANILINFARBEN FABRIK, OF OFFENBACH-ON-THE-MAIN, GERMANY.

OLIVE-GREEN SULFUR DYE AND PROCESS OF MAKING SAME.

SPECIFICATION forming part of Letters Patent No. 729,874, dated June 2, 1903.

Application filed March 3, 1903. Serial No. 145,988. (No specimens.)

*To all whom it may concern:*

Be it known that I, AUGUST LEOPOLD LASKA, doctor of philosophy, chemist, residing at 44 Gerberstrasse, Offenbach-on-the-Main, Germany, have invented new and useful Improvements in Olive-Green Sulfur Dyes, of which the following is a specification.

I have found that by treating diformyl-meta-phenylendiamin with sulfur and sodium sulfid under suitable conditions very valuable dyestuffs of a great coloring power are obtained which dye cotton in a bath containing sodium sulfid olive-green shades very fast to light and soap. If a condensing agent is added to the melt—for instance, salts of heavy metals—the properties of the resulting coloring-matters may be improved. Thus by adding zinc chlorid a dyestuff of a purer and more greenish tinge is obtained.

Trials to make sulfur dyes from acidulated meta-phenylendiamin have not been successful, as the products are of a feeble dyeing power and dye dim green-gray shades.

The diformyl-meta-phenylendiamin may be prepared in an easy manner, as described by Tobias in the *Berichte der Deutschen Chemischen Gesellschaft*, XV 2447.

The following is an example how to carry out my process; but I do not confine myself to the directions given, as they may be varied within wide limits without essentially altering the result. The parts are by weight, and the temperature degrees refer to the centigrade scale: Take two hundred and twenty-five parts of crystals of sodium sulfid, one hundred parts of sulfur, and fifteen parts of water and melt the whole mass until the complete fusion of the sulfur. Then at a temperature of 110° introduce a mixture of fifty parts of diformyl-meta-phenylendiamin and seven parts of zinc chlorid. Raise the temperature gradually to about 230°, continue heating to finally 275° until no more dyestuff is formed. After cooling the melt is powdered and can be used directly for dyeing purposes. The shades are purer and more greenish than those of other olive sulfur dyes actually in trade.

When carrying out the process without the aid of zinc chlorid, the greenish shade is not so bright.

The new dyestuff is easily soluble in water with a yellowish-green color and in concentrated sulfuric acid with a dirty-green color. On adding hydrochloric acid to the aqueous solution a yellowish-brown precipitate falls down which is soluble in diluted soda-lye and in diluted ammonia.

Now what I claim, and desire to secure by Letters Patent, is the following:

1. The process for the production of olive-green cotton dyestuffs by melting together diformyl-meta-phenylendiamin with sulfur and sodium sulfid.

2. The process for the production of olive-green cotton dyestuffs by melting together diformyl-meta-phenylendiamin with sulfur and sodium sulfid simultaneously with salts of heavy metals.

3. The process for the production of olive-green cotton dyestuffs by melting together diformyl-meta-phenylendiamin with sulfur and sodium sulfid in the presence of zinc chlorid.

4. As a new article of manufacture the dyestuff which is obtained by melting together diformyl-meta-phenylendiamin with sulfur and sodium sulfid in the presence of zinc chlorid, forming a black brittle mass, which may easily be powdered and which dissolves in concentrated sulfuric acid to a dirty-green, and in water to a greenish-yellow solution from which hydrochloric acid separates a yellowish-brown precipitate, which is soluble in diluted soda-lye and in diluted ammonia all substantially as hereinbefore described.

In testimony whereof I have signed my name to this specification in the presence of two subscribing witnesses.

AUGUST LEOPOLD LASKA.

Witnesses:
EVA SATTLER,
HERMANN WEIL.